(12) United States Patent
Phan

(10) Patent No.: US 7,286,136 B2
(45) Date of Patent: Oct. 23, 2007

(54) DISPLAY AND WEIGHTED DOT RENDERING METHOD

(75) Inventor: Gia Chuong Phan, Hong Kong (CN)

(73) Assignee: VP Assets Limited, Hong Kong (HK)

( * ) Notice: Subject to any disclaimer, the term of this patent is extended or adjusted under 35 U.S.C. 154(b) by 336 days.

(21) Appl. No.: 11/103,590

(22) Filed: Apr. 12, 2005

(65) Prior Publication Data

US 2006/0028495 A1 Feb. 9, 2006

Related U.S. Application Data

(63) Continuation-in-part of application No. 10/339,491, filed on Jan. 10, 2003, now Pat. No. 7,215,347.

(51) Int. Cl.
| | |
|---|---|
| G09G 5/00 | (2006.01) |
| G09G 3/20 | (2006.01) |
| G09G 5/02 | (2006.01) |
| G06F 15/00 | (2006.01) |
| G06K 9/36 | (2006.01) |
| G06K 9/32 | (2006.01) |
| G06K 9/00 | (2006.01) |

(52) U.S. Cl. .................. 345/589; 345/55; 345/694; 345/613; 382/162; 382/166; 382/299; 358/1.8

(58) Field of Classification Search .................. 345/33, 345/40–48, 55, 63, 72, 83–88, 204, 214, 345/690, 694, 589, 698, 613, 597; 382/162–167; 358/1.8, 1.9, 504, 534
See application file for complete search history.

(56) References Cited

U.S. PATENT DOCUMENTS

| | | | |
|---|---|---|---|
| 4,564,915 A | 1/1986 | Evans et al. | |
| 4,853,592 A | 8/1989 | Strathman | |
| 5,113,274 A | 5/1992 | Takahashi et al. | |
| 5,132,674 A | 7/1992 | Bottorf | |
| 5,311,337 A | * | 5/1994 | McCartney, Jr. ............ 349/145 |
| 5,341,153 A | * | 8/1994 | Benzschawel et al. ...... 345/694 |

(Continued)

FOREIGN PATENT DOCUMENTS

DE 36 06 404 A1 9/1986

(Continued)

*Primary Examiner*—Wesner Sajous
(74) *Attorney, Agent, or Firm*—Birch, Stewart, Kolasch & Birch, LLP

(57) ABSTRACT

The invention relates to a display and an image data processing system. According to the arrangement of the display, two color dots having lower light intensity than the other two color dots in a white balance status are disposed on diagonal positions of the pixel group. Therefore, the display of the invention can improve the color balance in the pixel group to avoid visible dark vertical line. The image data processing system of the invention utilizes the weighted dot rendering device for pre-compressing data. We can expect that the video compressed data size or the video transmission speed is reduced accordingly to a ratio of ⅓ (¼ in the case of RGBW of 2×2 matrix arrangement because white (W) can be regenerated from the corresponding R, G, B), thus storage memory and transmission bandwidth can be reduced considerably without degrading the visual perception of the video quality on the proprietary VP display.

22 Claims, 11 Drawing Sheets

U.S. PATENT DOCUMENTS

| | | |
|---|---|---|
| 5,530,570 A * | 6/1996 | Terumoto .................... 349/106 |
| 5,559,529 A | 9/1996 | Maher |
| 5,847,684 A | 12/1998 | Strik |
| 6,219,025 B1 * | 4/2001 | Hill et al. .................... 345/589 |
| 6,239,783 B1 * | 5/2001 | Hill et al. .................... 345/694 |
| 6,326,981 B1 * | 12/2001 | Mori et al. ................. 345/695 |
| 6,661,429 B1 * | 12/2003 | Phan .......................... 345/694 |
| 7,091,986 B2 * | 8/2006 | Phan .......................... 345/589 |
| 7,215,347 B2 * | 5/2007 | Phan .......................... 345/694 |

FOREIGN PATENT DOCUMENTS

| | | |
|---|---|---|
| EP | 0 273 995 | 7/1988 |
| EP | 0 637 009 A2 | 2/1995 |
| EP | 0637009 A2 | 2/1995 |
| EP | 0 738 089 | 10/1996 |
| EP | 0 903 717 | 3/1999 |
| FR | 2 742 910 | 6/1997 |

* cited by examiner

DISPLAY AND WEIGHTED DOT RENDERING METHOD

CROSS-REFERENCE TO RELATED APPLICATIONS

This is a continuation-in-part of U.S. patent application Ser. No. 11/012,202, filed on Dec. 16, 2004; U.S. patent application Ser. No. 10/727,545, filed on Dec. 5, 2003; U.S. patent application Ser. No. 10/339,491, filed on Jan. 10, 2003; U.S. patent application Ser. No. 09/151,287, filed Sep. 11, 1998; and claims priority under 35 U.S.C. §119 and 37 C.F.R. §1.55(a) of German Application No. 197 41 132.0, filed Sep. 13, 1997.

BACKGROUND OF THE INVENTION

1. Field of the Invention

The invention relates to a display and an image data processing system.

2. Description of the Related Art

Conventional methods of video data compression are based to use non compressed video frame with a defined resolution to be compressed into compressed video format such as MPEG2, MPEG4, H.264. The disadvantage is that the compressed video data size and transmission speed depend on the initial uncompressed resolution of video frames. For Standard Definition Television (SDTV), the resolution is 720×RGB×480 and for High Definition Television (HDTV), the resolution is 1920×RGB×1080. For a given compression quality, the video compressed data size and video transmission speed of HDTV is much higher than SDTV, thus requiring more storage capacity and transmission bandwidth. Especially on mobile devise where the transmission of the third generation (3G) of mobile phone network is limited at the present 384 kbps (kilo bit per second), it is not possible to transmit QVGA of 320×RGB× 240 compressed video at 30 frames per second using 384 kbps transmission rate.

Therefore, it is necessary to provide an image data processing system so as to solve the above problem.

Furthermore, in conventional display of RGB in 3×1 matrix or RGBW in 4×1 matrix, the darkest color in a white balance is the blue color which is usually aligned vertically so that dark vertical lines are easily visible. Therefore, it is necessary to rearrange the color dots in a display to minimize the visibility of the dark lines in a white balance caused by the blue color.

SUMMARY OF THE INVENTION

One objective of the present invention is to provide a display. The display comprises a plurality of pixel groups, each pixel group comprising a plurality of dots arranged in a predetermined identical matrix form, each pixel group having at least one first color dot, at least one second color dot, at least one third color dot and at least one fourth color dot, the pixel groups arranged in a matrix manner so as to form the display, wherein the first color dot and the second color dot have lower light intensity than the third color dot and the fourth color dot in a white balance status, the first color dot and the second color dot are disposed on diagonal positions of the predetermined identical matrix of the pixel group, and each color dot represents a luminance and a chrominance of a corresponding full color pixel data by grouping with neighboring dots to form a plurality of overlapping full color dynamics pixel groups.

In a white balance status, the red color dot and the blue color dot have lower light intensity than the green color dot and the white color dot. Besides, human eyes are disposed on a horizontal level so that human visual perception is more sensible on horizontal lines. On the other hand, human head as well as human eyes balls are easy to move up and down so that human visual perception is also more familiar with vertical lines. Therefore, the red color and blue color shall be arranged in diagonal line so that human perception tends to divide the darker diagonal line into horizontal and vertical components, thus the darker diagonal line is less sensible to human vision. Thus, the arrangement of the display can improve the color balance in the pixel group to avoid visible dark vertical line.

Another objective of the present invention is to provide an image data processing system. The image data processing system comprises a source device, a weighted dot rendering device, an encoding device, a decoding device. The source device is used to provide a first data of a first pixel arrangement. The weighted dot rendering device is used to convert the first data to a second data of a second pixel arrangement. The second pixel arrangement has a plurality of first color dots, a plurality of second color dots, a plurality of third color dots and a plurality of fourth color dots. Each dot of the second pixel arrangement represents a luminance and a chrominance of a corresponding full color pixel data by grouping with neighboring dots to form a plurality of overlapping full color dynamics pixel groups. The encoding device is used to encode the second data to a third data. The decoding device is used to decode the third data to the second data.

Therefore, the image data processing system of the invention utilizes the weighted dot rendering device for pre-compressing data. Besides, By utilizing the encoding device, for example MPEG4 or H.264 on this reduced video frame resolution, we can expect that the video compressed data size or the video transmission speed is reduced accordingly to a ratio of ⅓ (¼ in the case of RGBW of 2×2 matrix arrangement because white (W) can be regenerated from the corresponding R, G, B), thus storage memory and transmission bandwidth can be reduced considerably without degrading the visual perception of the video quality on the proprietary VP display.

BRIEF DESCRIPTION OF THE DRAWING

Further advantageous measures are described in the dependent claims. The invention is shown in the attached drawing and is described hereinafter in greater detail.

DETAILED DESCRIPTION OF THE INVENTION

According to the invention, a display comprises a plurality of pixel groups. Each pixel group comprises a plurality of dots arranged in a predetermined identical matrix form. Each pixel group having at least one first color dot, at least one second color dot, at least one third color dot and at least one fourth color dot. The pixel groups arranged in a matrix manner so as to form the display. Wherein each color dot has a plurality of sides adjacent to the other dots with different color. The first color dot and the second color dot have lower light intensity than the third color dot and the fourth color dot in a white balance status. The first color dot and the second color dot are disposed on diagonal positions of the predetermined identical matrix of the pixel group. Each color dot represents a luminance and a chrominance of a corresponding full color pixel data by grouping with neighboring dots to form a plurality of overlapping full color dynamics pixel groups.

Figure 1A:
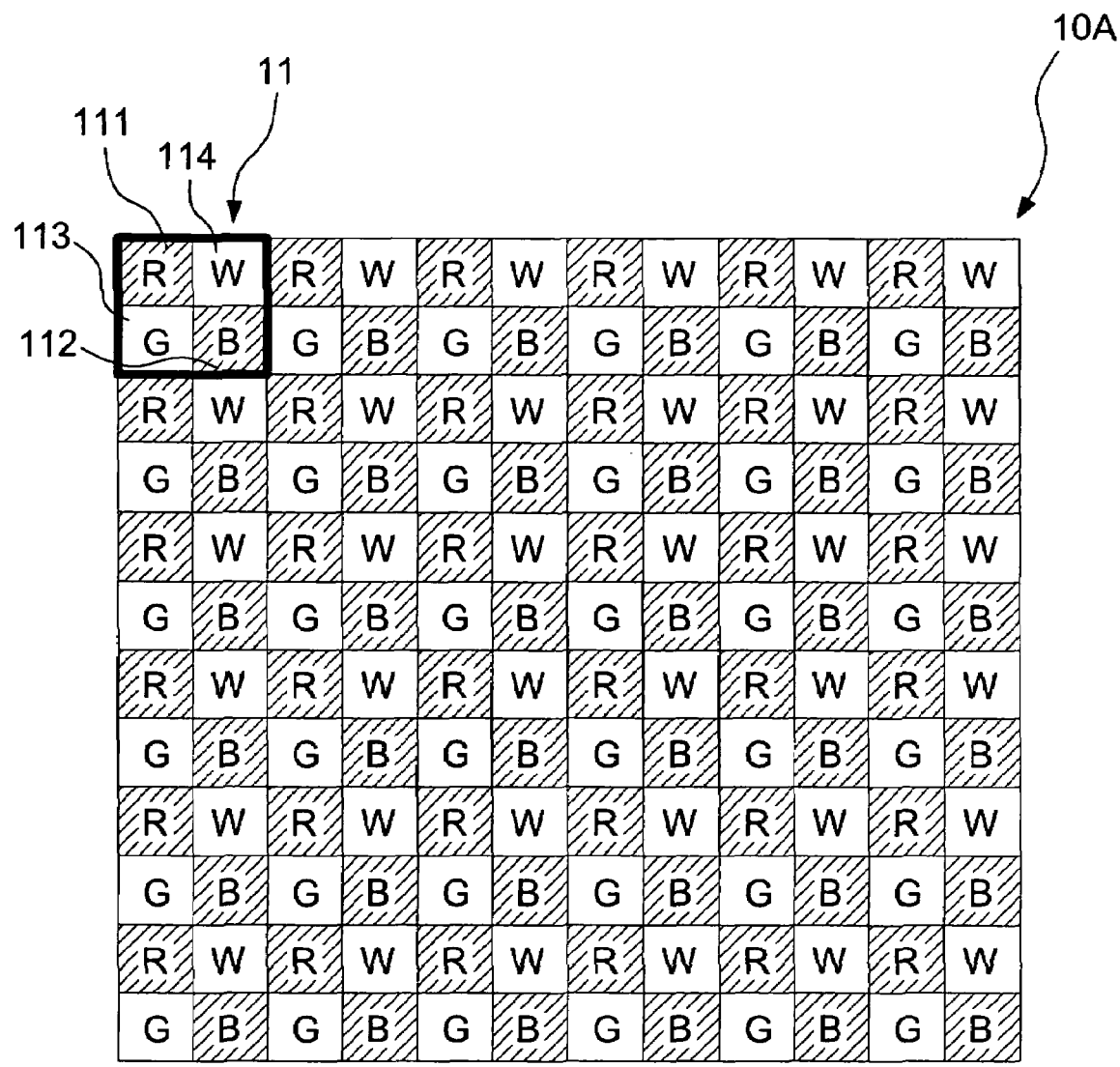
FIG. 1A shows an arrangement of a display, according to a first embodiment of the invention.

Referring to FIG. 1A, according to the invention, a display 10A of a first embodiment comprises a plurality of pixel groups 11. Each pixel group comprises four quadrate dots arranged in a 2×2 matrix. Each pixel groups 11 comprises a first color dot 111 (R), a second color dot 112 (B), a third color dot 113 (G) and a fourth color dot 114 (W). The first color dot 111 is a red dot (R), the second color dot 112 is a blue dot (B), and the third color dot 113 is a green dot (G). The fourth color dot 114 is a white color dot (W).

The first color dot 111 (R) and the second color dot 112 (B) have lower light intensity than the third color dot 113 (G) and the fourth color dot 114 (W) in a white balance status. Therefore, the first color dot 111 (R) and the second color dot 112 (B) are disposed on diagonal positions of the pixel group 11. That is, the first color dot 111 (R) is disposed on a first column and a first row position of the pixel group 11, and the second color dot 112 (B) is disposed on a second column and a second row position of the pixel group 11.

Figure 2A:
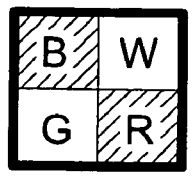
FIGS. 2A to 2G show arrangements of the pixel group, according to the first embodiment of the invention.
Figure 2B:
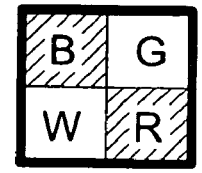

In the other embodiment, the first color dot (R) may be disposed on a second column and a second row position of the pixel group, and the second color dot (B) may be disposed on a first column and a first row position of the pixel group, as shown in FIG. 2A. And, the third color dot (G) may be disposed on a first column and a second row position of the pixel group, and the fourth color dot (W) may be disposed on a second column and a first row position of the pixel group. Referring to FIG. 2B, the positions of the third color dot (G) and the fourth color dot (W) are changed, and the positions of the first color dot (R) and the second color dot (B) are the same as the arrangement in FIG. 2A.

Figure 2C:
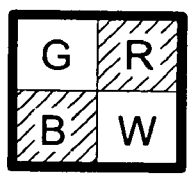
Figure 2D:
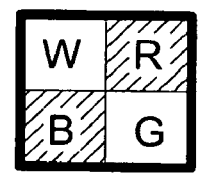

Besides, the first color dot (R) may be disposed on a second column and a first row position of the pixel group, and the second color dot (B) may be disposed on a first column and a second row position of the pixel group, as shown in FIG. 2C. And, the third color dot (G) may be disposed on a first column and a first row position of the pixel group, and the fourth color dot (W) may be disposed on a second column and a second row position of the pixel group. Referring to FIG. 2D, the positions of the third color dot (G) and the fourth color dot (W) are changed, and the positions of the first color dot (R) and the second color dot (B) are the same as the arrangement in FIG. 2C.

Figure 2E:
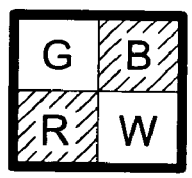
Figure 2F:
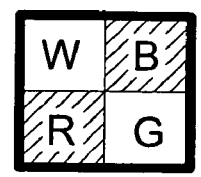

Furthermore, the first color dot (R) may be disposed on a first column and a second row position of the pixel group, and the second color dot (B) may be disposed on a second column and a first row position of the pixel group, as shown in FIG. 2E. And, the third color dot (G) may be disposed on a first column and a second row position of the pixel group, and the fourth color dot (W) may be disposed on a second column and a first row position of the pixel group. Referring to FIG. 2F, the positions of the third color dot (G) and the fourth color dot (W) are changed, and the positions of the first color dot (R) and the second color dot (B) are the same as the arrangement in FIG. 2E.

Figure 2G:
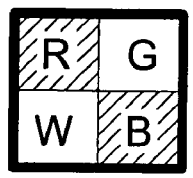

Referring to FIG. 2G, the positions of the third color dot (G) and the fourth color dot (W) are changed, and the positions of the first color dot (R) and the second color dot (B) are the same as the arrangement in FIG. 1A.

Generally, in a white balance status, the red color dot and the blue color dot have lower light intensity than the green color dot and the white color dot. Besides, human eyes are disposed on a horizontal level so that human visual perception is more sensible on horizontal lines. On the other hand, human head as well as human eyes balls are easy to move up and down so that human visual perception is also more familiar with vertical lines. According to the invention, the first color dot 111 (R) and the second color dot 113 (B) with lower light intensity are disposed on diagonal positions of the pixel group 11, and human visual perception tends to divide the lower light intensity of the first color dot 111 (R) and the second color dot 113 (B), arranged in diagonal line, into a horizontal component and a vertical component, thus the darker diagonal line is less sensible to human vision. Therefore, the arrangement of the display 10A can improve the color balance in the pixel group to avoid visible dark vertical line. In conventional display of RGB in 3×1 matrix or RGBW in 4×1 matrix, the darkest color in a white balance is the blue color which is usually aligned vertically so that dark vertical lines are easily visible.

Figure 3B:
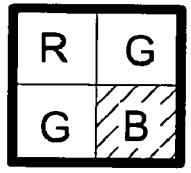
FIG. 3B shows the overlapping full color dynamics pixel groups, according to the second embodiment of the invention.
Figure 3B:
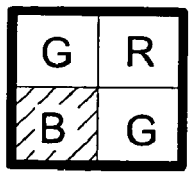
Figure 3B:
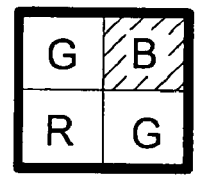
Figure 3B:
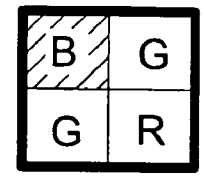
Figure 3C:
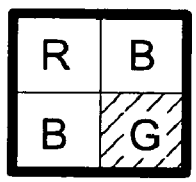
FIG. 3C shows the overlapping full color dynamics pixel groups, according to the third embodiment of the invention.
Figure 3C:
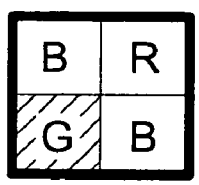
Figure 3C:
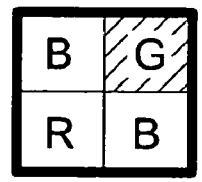
Figure 3C:
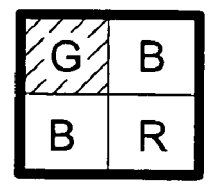
Figure 3A:
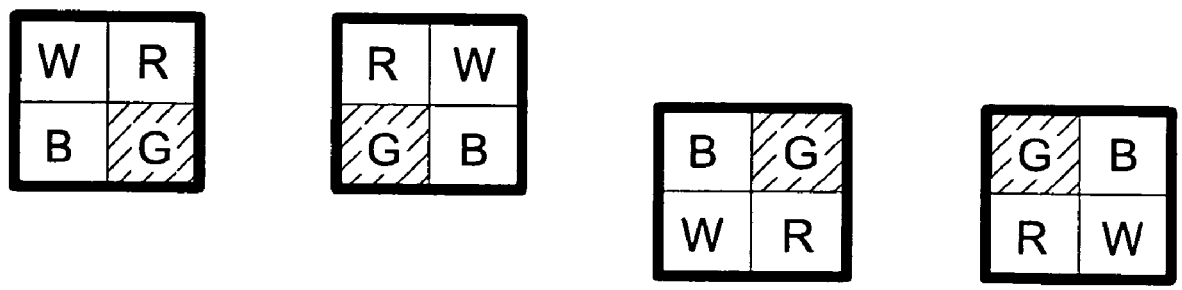
FIG. 3A shows the overlapping full color dynamics pixel groups, according to the first embodiment of the invention.

Referring to FIG. 3A, in the display 10A shown in FIG. 1A, each color dot represents a luminance and a chrominance of a corresponding full color pixel data by grouping with neighboring dots to form a plurality of overlapping full color dynamics pixel groups. For example, a selected dot (G) is determined from the dots of the arrangement of FIG. 1A. The selected dot (G) and three neighboring dots form an overlapping full color dynamics pixel group, and there are four overlapping full color dynamics pixel groups shown in FIG. 3A. A first overlapping full color dynamics pixel group comprises the selected dot (G), a left dot (B), a forward dot (R) and a left-forward dot (W); a second overlapping full color dynamics pixel group comprises the selected dot (G), a right dot (B), a forward dot (R) and a right-forward dot (W); a third overlapping full color dynamics pixel group comprises the selected dot (G), a left dot (B), a backward dot (R) and a left-backward dot (W); a fourth overlapping full color dynamics pixel group comprises the selected dot (G), a right dot (B), a backward dot (R) and a right-backward dot (W).

Figure 1B:
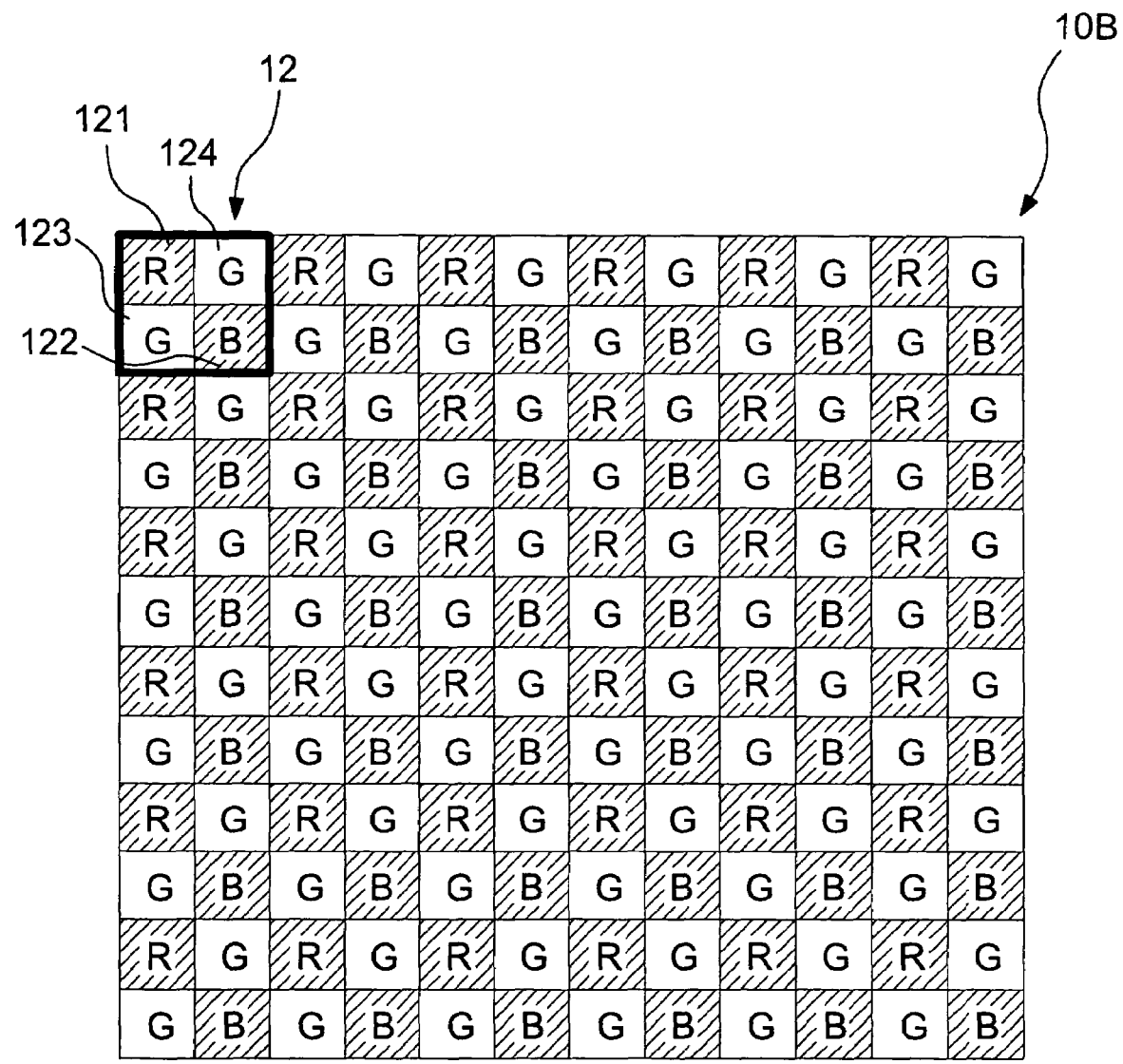
FIG. 1B shows an arrangement of a display, according to a second embodiment of the invention.

Referring to FIG. 1B, according to the invention, a display 10B of a second embodiment comprises a plurality of pixel groups 12. Each pixel group 12 comprises four quadrate dots arranged in a 2×2 matrix. Each pixel groups 12 comprises a first color dot 121 (R), a second color dot 122 (B), a third color dot 123 (G) and a fourth color dot 124 (G). The first color dot 121 is a red dot, the second color dot 122 is a blue dot (B), and the third color dot 123 and the fourth color dot 124 are green dots (G).

The first color dot 121 (R) and the second color dot 122 (B) have lower light intensity than the third color dot 123 (G) and the fourth color dot 124 (G) in a white balance status. Therefore, the first color dot 121 (R) and the second color dot 122 (B) are disposed on diagonal positions of the pixel group 12. That is, the first color dot 121 (R) is disposed on a first column and a first row position of the pixel group 12, and the second color dot 122 (B) is disposed on a second column and a second row position of the pixel group 12.

Figure 2H:
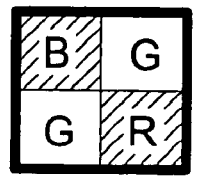
FIGS. 2H to 2J show arrangements of the pixel group, according to the second embodiment of the invention.

In the other embodiment, the first color dot (R) may be disposed on a second column and a second row position of the pixel group, and the second color dot (B) may be disposed on a first column and a first row position of the pixel group, as shown in FIG. 2H. And, the third color dot (G) may be disposed on a first column and a second row position of the pixel group, and the fourth color dot (G) may be disposed on a second column and a first row position of the pixel group.

Figure 2I:
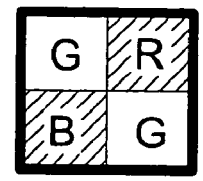
Figure 2J:
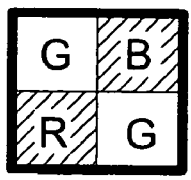

Besides, the first color dot (R) may be disposed on a second column and a first row position of the pixel group, and the second color dot (B) may be disposed on a first column and a second row position of the pixel group, as shown in FIG. 2I. And, the third color dot (G) may be disposed on a first column and a first row position of the pixel group, and the fourth color dot (G) may be disposed on a second column and a second row position of the pixel group. Furthermore, the first color dot (R) may be disposed on a first column and a second row position of the pixel group, and the second color dot (B) may be disposed on a second column and a first row position of the pixel group, as shown in FIG. 2J. And, the third color dot (G) may be disposed on a first column and a first row position of the pixel group, and the fourth color dot (G) may be disposed on a second column and a second row position of the pixel group.

Referring to FIG. 3B, in the display 10B shown in FIG. 1B, each color dot represents a luminance and a chrominance of a corresponding full color pixel data by grouping with neighboring dots to form a plurality of overlapping full color dynamics pixel groups. For example, a selected dot (B) is determined from the dots of the arrangement of FIG. 1B. The selected dot (B) and three neighboring dots form an overlapping full color dynamics pixel group, and there are four overlapping full color dynamics pixel groups shown in FIG. 3B. A first overlapping full color dynamics pixel group comprises the selected dot (B), a left dot (G), a forward dot (G) and a left-forward dot (R); a second overlapping full color dynamics pixel group comprises the selected dot (B), a right dot (G), a forward dot (G) and a right-forward dot (R); a third overlapping full color dynamics pixel group comprises the selected dot (B), a left dot (G), a backward dot (G) and a left-backward dot (R); a fourth overlapping full color dynamics pixel group comprises the selected dot (B), a right dot (G), a backward dot (G) and a right-backward dot (R).

Figure 1C:
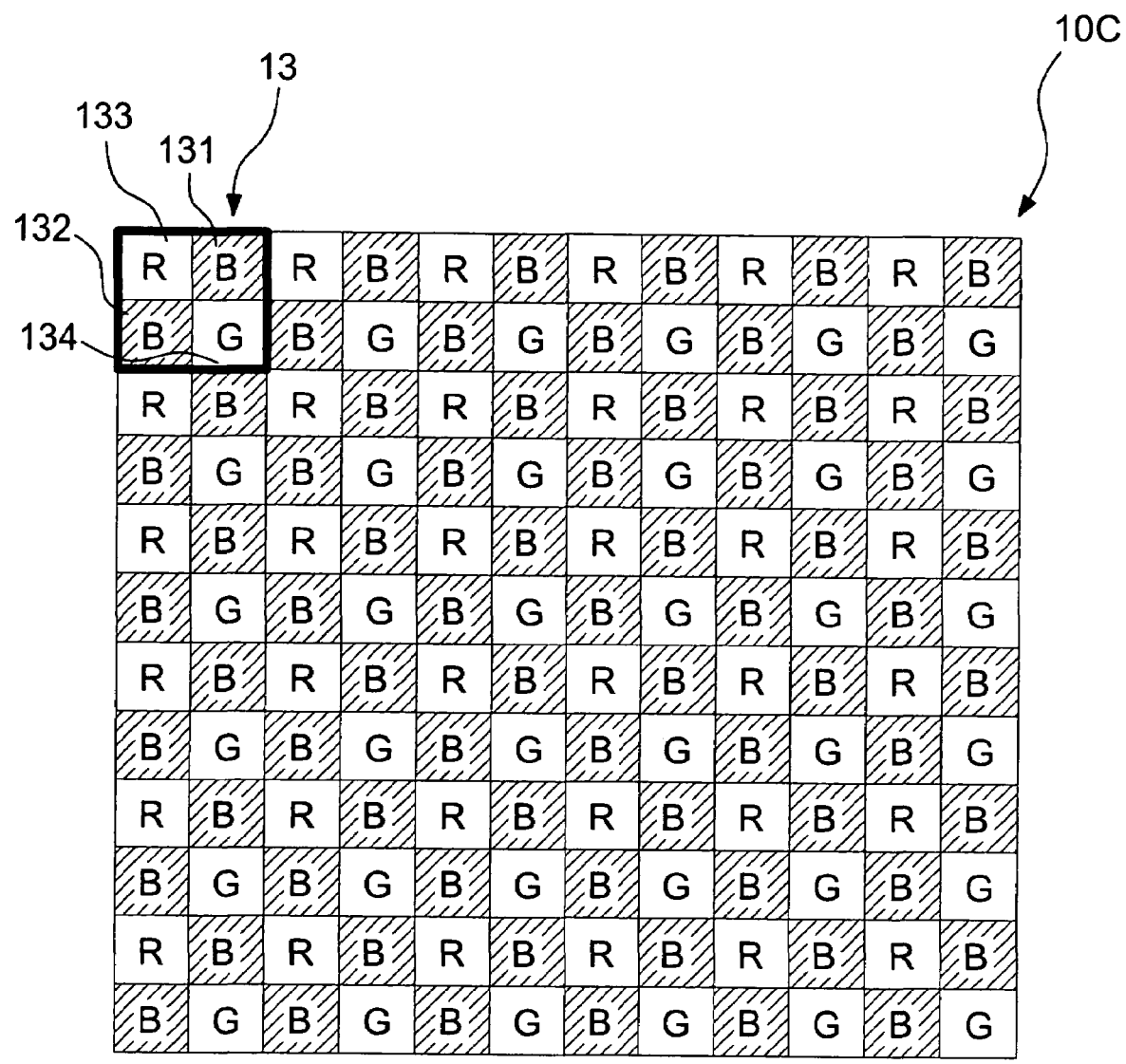
FIG. 1C shows an arrangement of a display, according to a third embodiment of the invention.

Referring to FIG. 1C, according to the invention, a display 10C of a third embodiment comprises a plurality of pixel groups 13. Each pixel group 13 comprises four quadrate dots arranged in a 2×2 matrix. Each pixel groups 13 comprises a first color dot 131 (B), a second color dot 132 (B), a third color dot 133 (R) and a fourth color dot 134 (G). The first color dot 131 and the second color dot 132 are blue dots (B), the third color dot 133 is a red dot (R), and the fourth color dot 134 is a green dot (G).

The first color dot 131 (B) and the second color dot 132 (B) have lower light intensity than the third color dot 133 (R) and the fourth color dot 134 (G) in a white balance status. Therefore, the first color dot 131 (B) and the second color dot 132 (B) are disposed on diagonal positions of the pixel group 13. That is, the first color dot 131 (B) is disposed on a second column and a first row position of the pixel group, and the second color dot 132 (B) is disposed on a first column and a second row position of the pixel group.

Figure 2K:
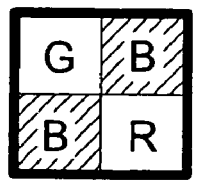
FIGS. 2K to 2M show arrangements of the pixel group, according to the third embodiment of the invention.

In the other embodiment, the first color dot (B) may be disposed on a second column and a first row position of the pixel group, and the second color dot (B) may be disposed on a first column and a second row position of the pixel group, as shown in FIG. 2K. And, the third color dot (R) may be disposed on a second column and a second row position of the pixel group, and the fourth color dot (G) may be disposed on a first column and a first row position of the pixel group.

Figure 2L:
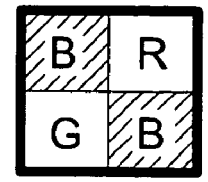
Figure 2M:
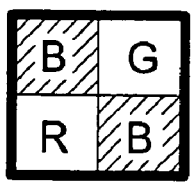

Besides, the first color dot (B) may be disposed on a first column and a first row position of the pixel group, and the second color dot (B) may be disposed on a second column and a second row position of the pixel group, as shown in FIG. 2L. And, the third color dot (R) may be disposed on a second column and a first row position of the pixel group, and the fourth color dot (G) may be disposed on a first column and a second row position of the pixel group. Furthermore, referring to FIG. 2M, the first color dot (B) may be disposed on a first column and a first row position of the pixel group, and the second color dot (B) may be disposed on a second column and a second row position of the pixel group. And, the third color dot (R) may be disposed on a first column and a second row position of the pixel group, and the fourth color dot (G) may be disposed on a second column and a first row position of the pixel group.

Referring to FIG. 3C, in the display 10C shown in FIG. 1C, each color dot represents a luminance and a chrominance of a corresponding full color pixel data by grouping with neighboring dots to form a plurality of overlapping full color dynamics pixel groups. For example, a selected dot (G) is determined from the dots of the arrangement of FIG. 1C. The selected dot (G) and three neighboring dots form an overlapping full color dynamics pixel group, and there are four overlapping full color dynamics pixel groups shown in FIG. 3C. A first overlapping full color dynamics pixel group comprises the selected dot (G), a left dot (B), a forward dot (B) and a left-forward dot (R); a second overlapping full color dynamics pixel group comprises the selected dot (G), a right dot (B), a forward dot (B) and a right-forward dot (R); a third overlapping full color dynamics pixel group comprises the selected dot (G), a left dot (B), a backward dot (B) and a left-backward dot (R); a fourth overlapping full color dynamics pixel group comprises the selected dot (G), a right dot (B), a backward dot (B) and a right-backward dot (R).

Figure 1D:
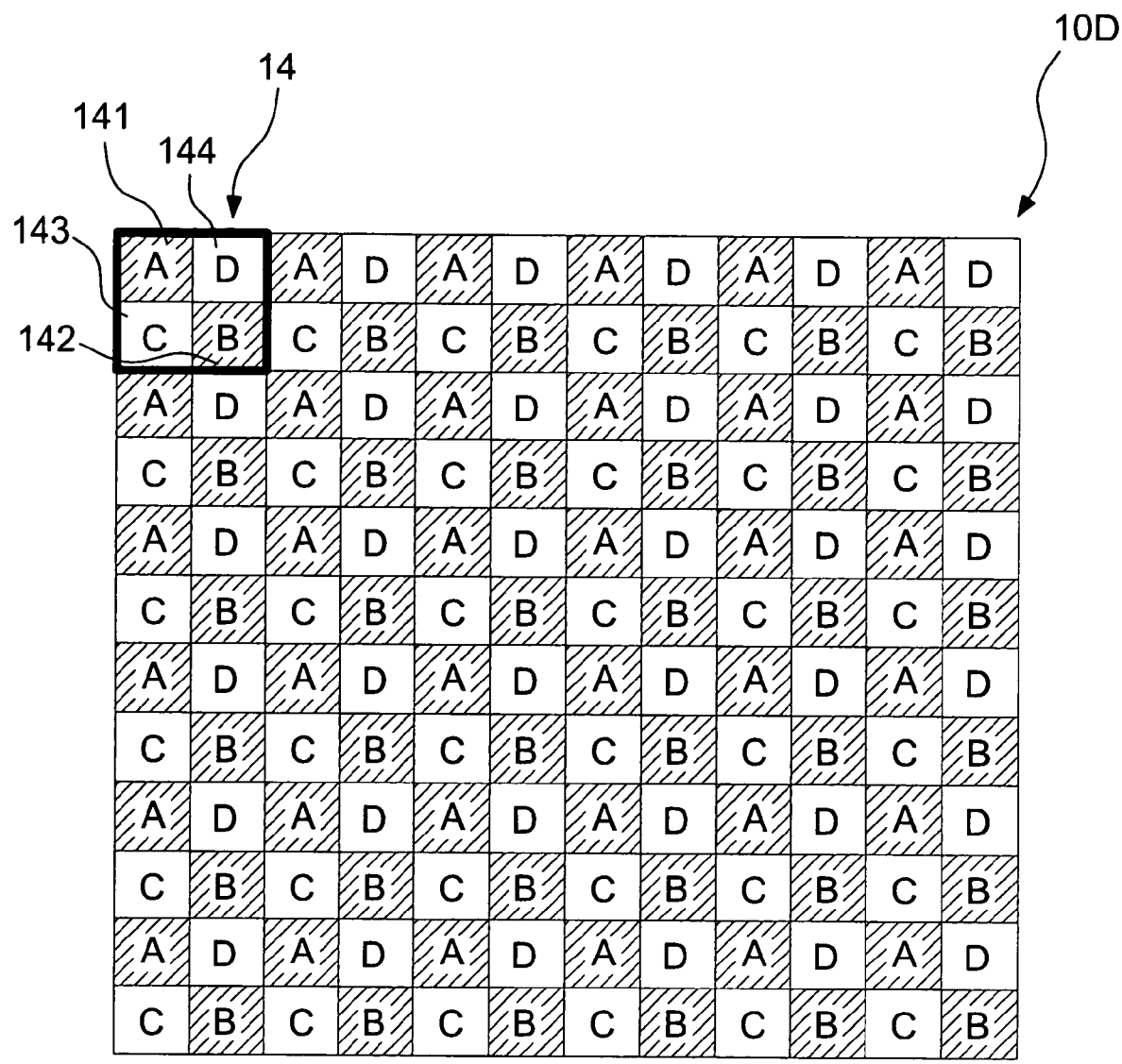
FIG. 1D shows an arrangement of a display, according to a fourth embodiment of the invention.

Referring to FIG. 1D, according to the invention, a display 10D of a fourth embodiment comprises a plurality of pixel groups 14. Each pixel group comprises four quadrate dots arranged in a 2×2 matrix. Each pixel groups 14 comprises a first color dot 141 (A), a second color dot 142 (B), a third color dot 143 (C) and a fourth color dot 144 (D). The first color dot 141, the second color dot 142, the third color dot 143 and the fourth color dot 144 do not be limited to any color.

If the first color dot 141 (A) and the second color dot 142 (B) have lower light intensity than the third color dot 143 (C)

and the fourth color dot 144 (D) in a white balance status, the first color dot 141 (A) and the second color dot 142 (B) are disposed on diagonal positions of the pixel group 14. That is, the first color dot 141 (A) is disposed on a first column and a first row position of the pixel group 14, and the second color dot 142 (B) is disposed on a second column and a second row position of the pixel group 14.

Figure 4A:
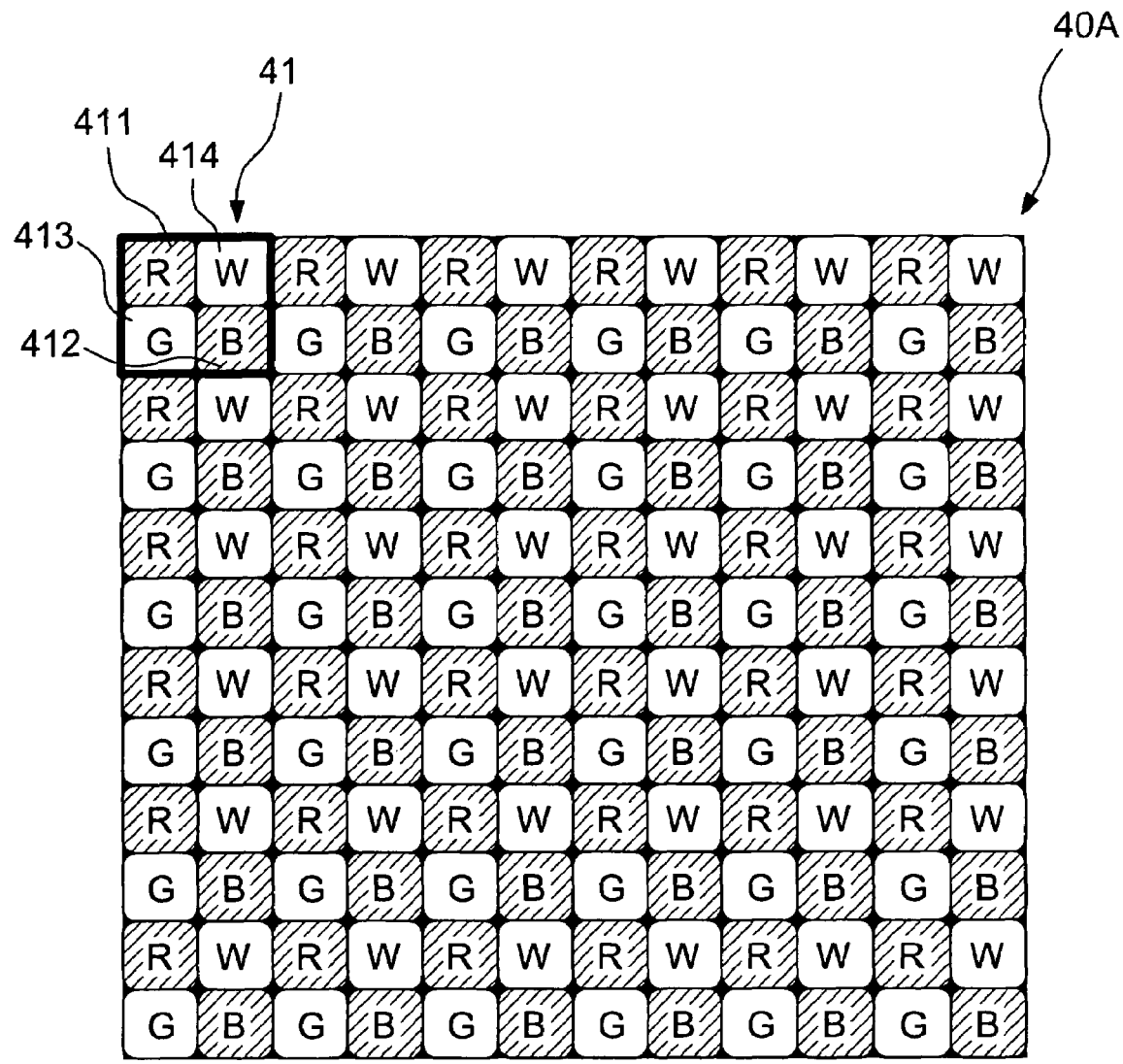
FIG. 4A shows an arrangement of a display, according to a fifth embodiment of the invention.

Referring to FIG. 4A, according to the invention, a display 40A of a fifth embodiment comprises a plurality of pixel groups 41. Each pixel group comprises four quadrate dots with curved comers arranged in a 2×2 matrix. Each pixel groups 41 comprises a first color dot 411 (R), a second color dot 412 (B), a third color dot 413 (G) and a fourth color dot 414 (W). Similarly to the first embodiment, the first color dot 411 (R) and the second color dot 412 (B) are disposed on diagonal positions of the pixel group 41. In the fifth embodiment of the invention, the color dots are quadrate shape with curved comers so as to smooth out the saw tooth influence in oblique line caused by quadrate shape as shown in FIG. 1A. Furthermore, the curved comers of the display 40A can increase the contrast without sacrificing too much the luminance.

Figure 4B:
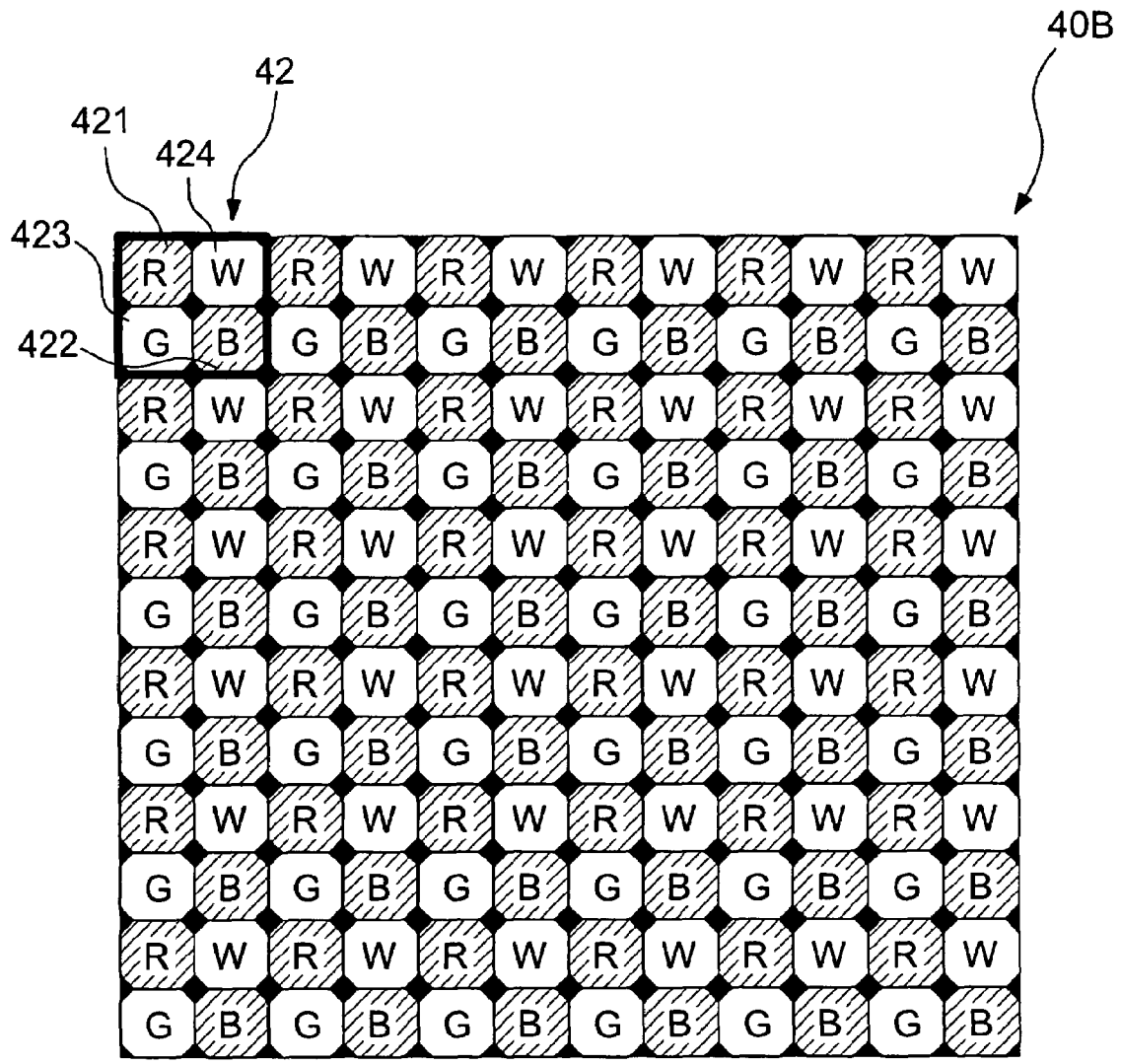
FIG. 4B shows an arrangement of a display, according to a sixth embodiment of the invention.

Referring to FIG. 4B, according to the invention, a display 40B of a sixth embodiment comprises a plurality of pixel groups 42. Each pixel group comprises four octagonal dots arranged in a 2×2 matrix. Each octagonal dot has eight sides with uneven length. The length of the sides on the corner is shorter than that on the center. Each pixel groups 42 comprises a first color dot 421 (R), a second color dot 422 (B), a third color dot 423 (G) and a fourth color dot 424 (W). Similarly to the first embodiment, the first color dot 421 (R) and the second color dot 422 (B) are disposed on diagonal positions of the pixel group 42. In the sixth embodiment of the invention, the octagonal dots have eight sides with shorter corner sides so as to smooth out the saw tooth influence in oblique line caused by quadrate shape as shown in FIG. 1A. Furthermore, the shorter corner sides of the display 40B can increase the contrast without sacrificing too much the luminance.

Figure 5:
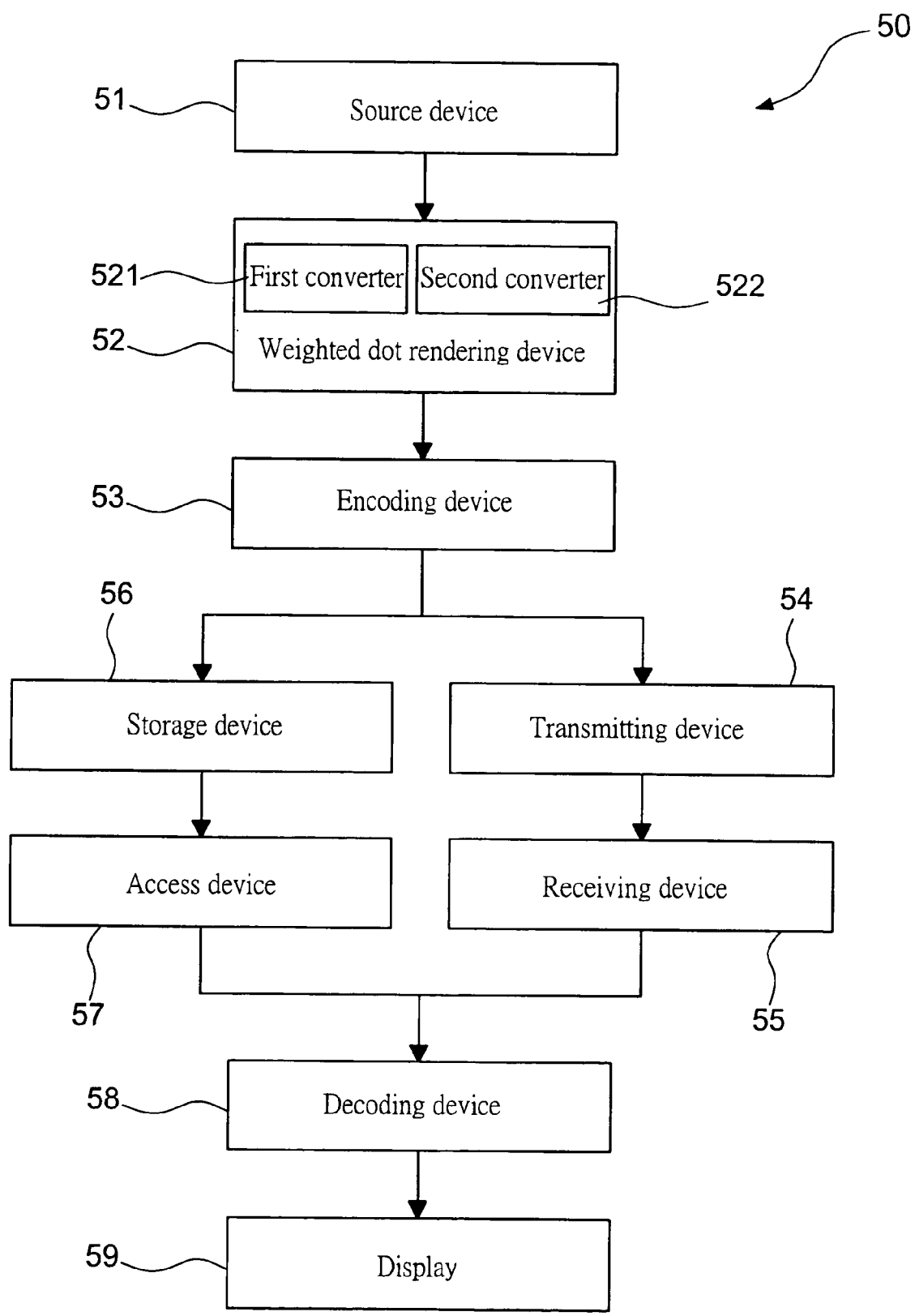
FIG. 5 shows the block diagram of the image data processing system, according to the invention.

Referring to FIG. 5, according to the invention, an image data processing system 50 comprises: a source device 51, a weighted dot rendering device 52, an encoding device 53, a transmitting device 54, a receiving device 55, a decoding device 58 and a display 59. The source device 51 is utilized for obtaining a first data of a first pixel arrangement. The first arrangement may have a plurality of conventional RGB groups, each RGB group has a red color dot, a green color dot and a blue color dot. The first data represent the color dots of the conventional RGB groups.

The source device 51 may be a sensor for obtaining the first data the first pixel arrangement. The source device 51 may be a media player for providing the first data of the first pixel arrangement. The source device 51 may provide the first data of the first pixel arrangement from a wire device, for example a TV cable, or a wireless device, for example a broadcasting system.

The weighted dot rendering device 52 is used for converting the first data to a second data of a second pixel arrangement. The second pixel arrangement has a plurality of first color dots, a plurality of second color dots, a plurality of third color dots and a plurality of fourth color dots, for example, the second pixel arrangement may be the display 10A as shown in FIG. 1A. Each dot of the second pixel arrangement represents a luminance and a chrominance of a corresponding full color pixel data by grouping with neighboring dots to form a plurality of overlapping full color dynamics pixel groups. The weighted dot rendering device 52 utilizes a weighted dot rendering method for converting the first data to the second data of the second pixel arrangement, and the weighted dot rendering method can refer to U.S. patent application Ser. Nos. 10/727,545 and 11/012,202. Therefore, the data amount of the second data can be reduced to ⅓ (¼ in the case of RGBW of 2×2 matrix arrangement because white (W) can be regenerated from the corresponding R, G, B) of the data amount of the first data.

The weighted dot rendering device 52 can directly convert the first data to the second data of the second pixel arrangement. Besides, the weighted dot rendering device 52 can firstly convert the first data to a fourth data of a fourth pixel arrangement, then convert the fourth data of the fourth pixel arrangement to the second data of the second data. The fourth pixel arrangement may have a plurality of conventional RGBW groups without overlapping full color dynamics pixel groups, each RGBW group has a red color dot, a green color dot, a blue color dot and a white color dot. The fourth data represent the color dots of the conventional RGBW groups. Therefore, the weighted dot rendering device 52 comprises a first converter 521 and a second converter 522. The first converter 521 is used for converting the first data to the fourth data, and the second converter 522 is used for converting the fourth data to the second data.

The encoding device 53 is utilizes for encoding the second data to a third data. The encoding device 53 may be a compression device for compressing the second data to the third data, for example MPEG type data. Therefore, the weighted dot rendering device 52 is a pre-compression device for compressing the first data to the second data before the encoding device 53, and the resolution do not change.

The transmitting device 54 is used for transmitting the third data. Because the data amount of the second data is ⅓ (¼ in the case of RGBW of 2×2 matrix arrangement because white (W) can be regenerated from the corresponding R, G, B) of the data amount of the first data, the transmitting device 54 can transmit more data by less bandwidth. The receiving device 55 is used for receiving the third data from the transmitting device 54. The decoding device 58 is used for decoding the third data from the receiving device 55 to the second data.

The image data processing system 50 further comprises a storage device 56 for storing the third data. Because the data amount of the second data is ⅓ (¼ in the case of RGBW of 2×2 matrix arrangement because white (W) can be regenerated from the corresponding R, G, B) of the data amount of the first data, the storage device 56 can store more data by less space. The image data processing system 50 further comprises an access device 57 for retrieving the third data from the storage device 56. The decoding device 58 can be used for decoding the third data from the access device 57 to the second data. The display 59 is used for displaying the second data.

Therefore, the image data processing system of the invention utilizes the weighted dot rendering device 52 for pre-compressing data. Besides, By utilizing the encoding device, for example MPEG4 or H.264 on this reduced video frame resolution, we can expect that the video compressed data size or the video transmission speed is reduced accordingly to a ratio of ⅓ (¼ in the case of RGBW of 2×2 matrix arrangement because white (W) can be regenerated from the corresponding R, G, B), thus storage memory and transmission bandwidth can be reduced considerably without degrading the visual perception of the video quality on the proprietary VP display.

While an embodiment of the present invention has been illustrated and described, various modifications and improvements can be made by those skilled in the art. The embodiment of the present invention is therefore described in an illustrative, but not restrictive, sense. It is intended that the present invention may not be limited to the particular forms as illustrated, and that all modifications which maintain the spirit and scope of the present invention are within the scope as defined in the appended claims.

What is claimed is:

1. A display, comprising:
   a plurality of pixel groups, each pixel group comprising a plurality of dots arranged in a predetermined identical matrix form, each pixel group having at least one first color dot, at least one second color dot, at least one third color dot and at least one fourth color dot, the pixel groups arranged in a matrix manner so as to form the display, wherein each color dot has a plurality of sides adjacent to the other dots with different color, and the first color dot and the second color dot have lower light intensity than the third color dot and the fourth color dot in a white balance status, the first color dot and the second color dot are disposed on diagonal positions of the predetermined identical matrix of the pixel group, and each color dot represents a luminance and a chrominance of a corresponding full color pixel data by grouping with neighboring dots to form a plurality of overlapping full color dynamics pixel groups.

2. The display according to claim 1, wherein the first color dot is a red dot, the second color dot is a blue dot, the third color dot is a green dot and the fourth color dot is a white dot.

3. The display according to claim 1, wherein the first color dot is a red dot, the second color dot is a blue dot, the third color dot and the fourth color dot are green dots.

4. The display according to claim 1, wherein the first color dot and the second color dot are blue dots, the third color dot is a red dot and the fourth color dot is a green dot.

5. The display according to claim 1, wherein the pixel group comprises four quadrate dots arranged in a 2×2 matrix.

6. The display according to claim 1, wherein the pixel group comprises four octagonal dots arranged in a 2×2 matrix.

7. The display according to claim 1, wherein the pixel group comprises four quadrate dots with curved corners arranged in a 2×2 matrix.

8. The display according to claim 1, wherein the first color dot is disposed on a first column and a first row position of the pixel group, and the second color dot is disposed on a second column and a second row position of the pixel group.

9. The display according to claim 1, wherein the first color dot is disposed on a second column and a first row position of the pixel group, and the second color dot is disposed on a first column and a second row position of the pixel group.

10. The display according to claim 1, wherein the first color dot is disposed on a first column and a second row position of the pixel group, and the second color dot is disposed on a second column and a first row position of the pixel group.

11. The display according to claim 1, wherein the first color dot is disposed on a second column and a second row position of the pixel group, and the second color dot is disposed on a first column and a first row position of the pixel group.

12. An image data processing system, comprising:
    a source device for providing a first data of a first pixel arrangement;
    a weighted dot rendering device for converting the first data to a second data of a second pixel arrangement, the second pixel arrangement having a plurality of first color dots, a plurality of second color dots, a plurality of third color dots and a plurality of fourth color dots, each dot of the second pixel arrangement representing a luminance and a chrominance of a corresponding full color pixel data by grouping with neighboring dots to form a plurality of overlapping full color dynamics pixel groups;
    an encoding device for encoding the second data to a third data; and
    a decoding device for decoding the third data to the second data.

13. The image data processing system according to claim 12, wherein the first pixel arrangement has a plurality of RGB groups, each RGB group has a red color dot, a green color dot and a blue color dot, the first data represent the color dots of the RGB groups.

14. The image data processing system according to claim 12, wherein the first color dot is a red dot, the second color dot is a blue dot, the third color dot is a green dot and the fourth color dot is a white dot.

15. The image data processing system according to claim 12, wherein the encoding device is a compression device for compressing the second data to the third data.

16. The image data processing system according to claim 12, wherein the decoding device is a decompression device for decompressing the third data to the second data.

17. The image data processing system according to claim 12, wherein the image data processing system further comprises a transmitting device for transmitting the third data.

18. The image data processing system according to claim 17, wherein the image data processing system further comprises a receiving device for receiving the third data from the transmitting device.

19. The image data processing system according to claim 12, wherein the image data processing system further comprises a display for displaying the second data.

20. The image data processing system according to claim 12, wherein the image data processing system further comprises a storage device for storing the third data.

21. The image data processing system according to claim 20, wherein the image data processing system further comprises an access device for retrieving the third data from the storage device.

22. The image data processing system according to claim 12, wherein the weighted dot rendering device comprises a first converter and a second converter, the first converter is used for converting the first data to a fourth data, and the second converter is used for converting the fourth data to the second data.

* * * * *